US005356331A

United States Patent [19]

Madrigal-Ocegueda

[11] Patent Number: 5,356,331

[45] Date of Patent: Oct. 18, 1994

[54] METHOD OF PREPARING AN END CLOSURE FOR SHIRRED CASING

[75] Inventor: Florentino Madrigal-Ocegueda, Zacapu Michoacán, Mexico

[73] Assignee: Celanese Mexicana, Del A. Obreon, Mexico

[21] Appl. No.: 125,095

[22] Filed: Sep. 22, 1993

[51] Int. Cl.$^{5}$ .................... A22C 13/00

[52] U.S. Cl. .................... 452/32; 138/118; 452/21

[58] Field of Search .................... 452/32, 21; 138/118.1, 138/109; 426/138; 428/34.8, 36; 493/153, 121

[56] References Cited

U.S. PATENT DOCUMENTS

| | | | |
|---|---|---|---|
| 3,274,005 | 9/1966 | Alsys | 99/176 |
| 3,383,222 | 12/1968 | Alsys | 99/176 |
| 3,550,191 | 3/1971 | Matecki | 17/49 |
| 3,564,647 | 3/1971 | Matecki | 17/42 |
| 3,570,045 | 3/1971 | Matecki | 17/34 |
| 3,865,954 | 2/1975 | Tums | 426/140 |
| 3,892,869 | 7/1975 | Sheridan | 426/138 |
| 3,914,447 | 10/1975 | Tums | 426/390 |
| 4,070,729 | 1/1978 | Tums | 17/34 |
| 4,075,938 | 2/1978 | Martinek | 452/32 |
| 4,162,693 | 7/1979 | Beckman | 138/118.1 |
| 4,411,048 | 10/1983 | Green | 17/49 |
| 4,525,984 | 7/1985 | Killross | 53/483 |
| 4,551,370 | 11/1985 | Nausedas | 428/36 |
| 4,585,680 | 4/1986 | Nausedas | 428/36 |
| 4,674,153 | 6/1987 | Nausedas | 17/49 |
| 4,693,280 | 9/1987 | Beardsley | 138/118.1 |
| 4,759,100 | 7/1988 | Beardsley | 17/45 |
| 4,873,748 | 10/1989 | Evyan et al. | 452/21 |
| 5,131,883 | 7/1992 | Hendricks et al. | 452/21 |
| 5,238,443 | 8/1993 | Beardsley | 452/21 |

FOREIGN PATENT DOCUMENTS

| | | | |
|---|---|---|---|
| 3248761 | 7/1984 | Fed. Rep. of Germany | 138/118.1 |

*Primary Examiner*—Willis Little

*Attorney, Agent, or Firm*—James M. Hunter, Jr.

[57] ABSTRACT

The present invention relates to a method of forming an end closure in one end of a tubular shirred casing and the like for stuffing meat products into the casing. The partially twisted, compacted end closure is suitable for withstanding breakage during pressure injection of meat products, e.g., sausage, frankfurter, etc., into the casing.

21 Claims, 3 Drawing Sheets

15
16
17
18
26
31
35
24
18
29
28

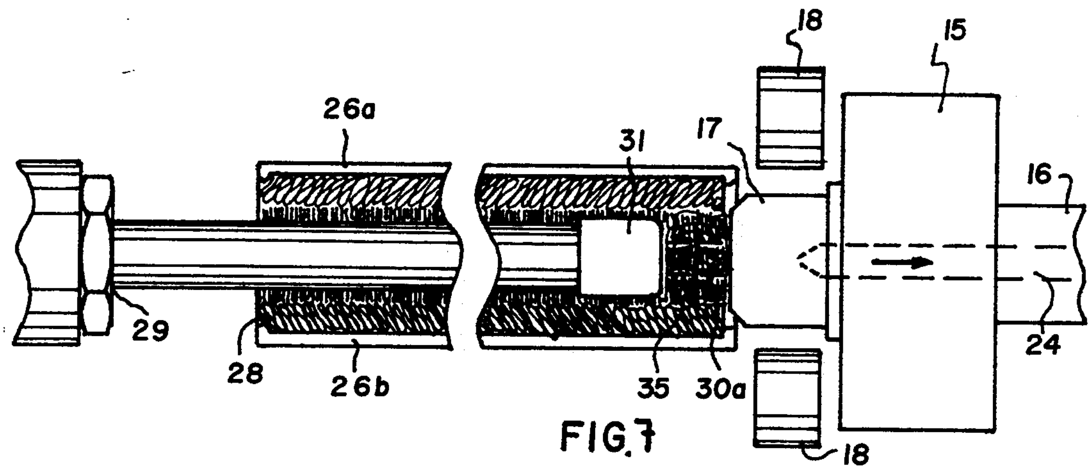
FIG. 7
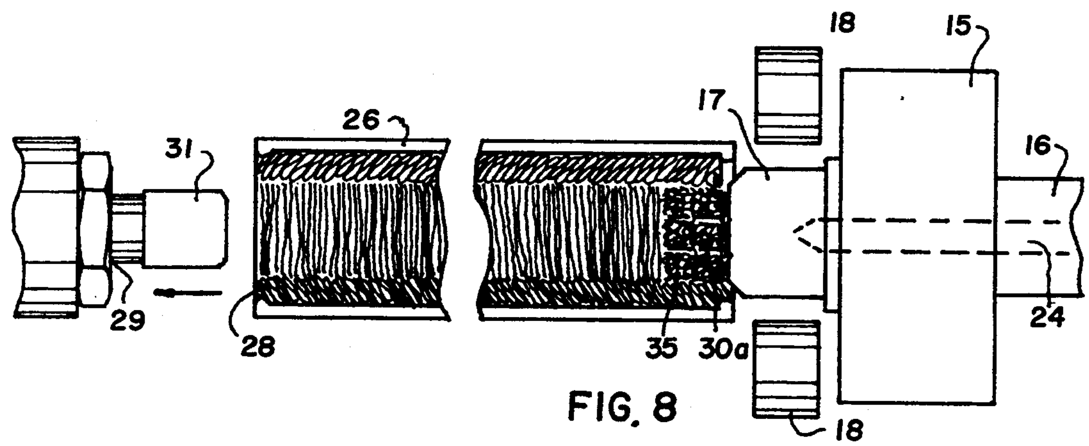
FIG. 8
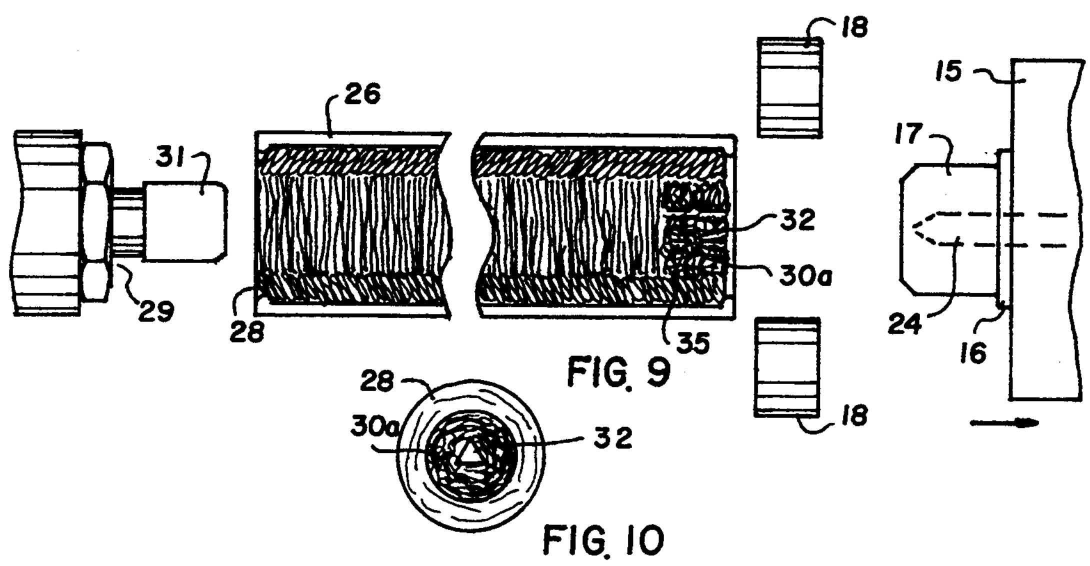
FIG. 9
FIG. 10

METHOD OF PREPARING AN END CLOSURE FOR SHIRRED CASING

FIELD OF THE INVENTION

The present invention relates to a novel end closure for a shirred casing utilized in forming stuffed meat products, i.e., sausages, and a method of preparing the end closure in a shirred casing. The end closure is necessary for terminating the end of the casing to retain the stuffing placed therein.

BACKGROUND OF THE INVENTION

In the industry of meat stuffing, e.g., Vienna and frankfurter sausages or special stuffings, tubular shirred casings are required to stuff the meat products. Dimensions of these casings vary depending on the particular product and machines used in preparation of the stuffings.

Several decades ago, all sausage casings were of natural origin, and prepared from animal intestines. Thereafter, several types of synthetic tubular casings for sausages were developed. In particular, regenerated cellulose casings are used in most of the sausages made and sold today.

One of the first stages in preparation of sausages, after the meat emulsion has been prepared, is the stuffing of such meat emulsion into the shirred tubular casings. However, before carrying out the stuffing process, it is required that a closure be formed at the end of the casing to avoid loss of the product therefrom. To that effect, several end closures for shirred casings have been suggested.

U.S. Pat. No. 3,274,005 to Alsys suggests using a hook to twist and invert the end of a shirred casing to produce an end closure. U.S. Pat. No. 3,383,222 to Alsys and U.S. Pat. No. 3,892,869 to Sheridan suggest forming an end closure by pulling the end of the casing to form a tab, closing the end temporarily; inserting a plunger to invert the tab; removing the plunger and placing the end in which the tab is inverted against a fixed surface; and inserting a plunger into the casing from the opposite end to compress the inverted tab and form the end closure.

U.S. Pat. Nos. 3,914,447 and 4,070,729 to Tums teach an end closure produced by inserting a rod into a hollow shirred casing without engaging any portion of the casing, and twisting the terminal pleats until a knot is formed, followed by withdrawing the rod from within the knot without disturbing the closure. The references also suggest placing a passage in the end closure that will permit the passage of gases therethrough but will restrain the passage of food emulsion.

U.S. Pat. No. 4,411,048 to Green suggests supporting a shirred casing on a mandrel; using a hook to grab and remove an end portion of the casing from the mandrel; twisting an end to form a knot; inverting the knot into the casing and placing the inverted end against a fixed surface; and compressing against the surface by inserting a plunger through the mandrel.

U.S. Pat. No. 4,536,175 to Arnold suggest a process for forming an end closure by deshirring the terminal pleats of one end of the strand, inverting the deshirred casing into the bore of the strand, and winding the deshirred casing inside the bore into an end-closure plug.

SUMMARY OF THE INVENTION

The present invention is directed to an end closure for a shirred tubular casing, prepared according to a method characterized by the steps of:

a. positioning a shirred, tubular casing having a hollow, axial interior, a shirred end and an unshirred end inside a casing guide for securing the shirred end against rotating or shifting about its longitudinal axis, wherein the unshirred end extends outside the casing guide at a shirred-unshirred interface;
b. axially sliding compacting means from the shirred end through the interior of the tubular casing proximal to the shirred-unshirred interface;
c. axially sliding guiding means having butting means attached thereto from the unshirred end through the interior of the tubular casing proximal to the shirred-unshirred interface, wherein the compacting means and guiding means axially contact proximal to the shirred-unshirred interface;
d. engaging a sealing means with the unshirred end, wherein the unshirred end intimately contacts the guiding means;
e. axially rotating the guiding means in contact with the unshirred end, wherein the unshirred end adheres to the guiding means and rotates therewith causing the unshirred end to wrap around the guiding means to produce a wrapped unshirred end, and wherein a portion of the shirred end may be unshirred and taken up in the wrapped unshirred end;
f. disengaging the sealing means from the wrapped unshirred end;
g. axially sliding the compacting means and guiding means having the wrapped unshirred end attached therearound through the casing to the shirred end, wherein a portion of the shirred end at the shirred-unshirred interface is unshirred and drawn through the casing to the shirred end;
h. axially sliding the butting means into engaging contact with the shirred-unshirred interface to prevent axial shifting of the casing at the interface;
i. axially sliding the compacting means and guiding means through the casing to the butting means, wherein the guiding means are disengaged from the compacting means proximal to the shirred-unshirred interface and are withdrawn from the casing, and wherein the wrapped unshirred end is compacted by the compacting means against the butting means; and
j. axially withdrawing the compacting means from the casing, disengaging the butting means, and removing the securing means from the casing, wherein the end closure exhibits a partially twisted, compacted, cylindrical element having an axial opening in the cross section for releasing gases which axial opening conforms to the shape of the cross section of the guiding means. The shirred tubular casing containing the end closure may be utilized for the efficient stuffing of sausage and the like.

BRIEF DESCRIPTION OF THE DRAWINGS

While the specification concludes with claims particularly pointing out and distinctly claiming the present invention, the present invention will be better understood from the following description in conjunction with the accompanying drawings in which:

FIG. 7 is a longitudinal-section view in elevation of a shirred tubular casing illustrating the withdrawal of the end closure guide from the end closure into the external butt;

FIG. 8 is a longitudinal-section view in elevation of a shirred tubular casing illustrating the withdrawal of the compaction plunger and internal butt;

FIG. 9 is a longitudinal-section view in elevation of a shirred tubular casing illustrating the disengagement of the external butt from the casing guide; and FIG. 10 is a cross-sectional view in elevation of a shirred tubular casing illustrating a triangular breathing port in the end closure.

DETAILED DESCRIPTION OF THE INVENTION

In accordance with the present invention there is described a method of preparing a novel end closure in a shirred tubular casing prior to stuffing the casing, wherein the end closure is characterized by a partially twisted, compressed element at one end of the casing. The end closure is further characterized by a breathing port located axial in an end of the casing for releasing pressurized gases and the like generated during the stuffing process.

Figure 1:
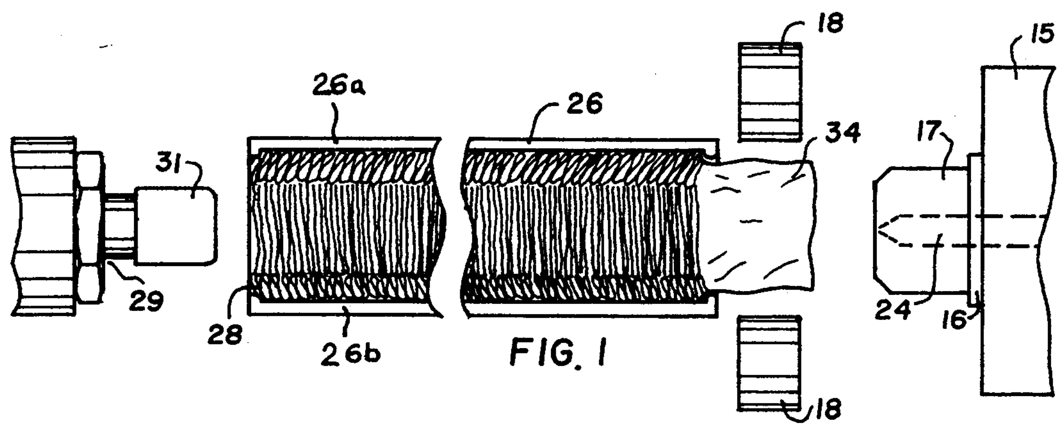
FIG. 1 is a longitudinal-section view in elevation of a shirred tubular casing mounted within a casing guide having an unshirred end outside of the guide.

Referring to FIG. 1, the end closure may be prepared in an end of a shirred casing according to a method characterized by positioning into a cylindrical casing guide (26), a shirred tubular casing (28) delivered from a shirring machine. The casing guide is characterized by at least two (2) adjoining concave plates detachably held together by seal clips (**26*a* and 26*b*) to prevent axial rotation or longitudinal shifting of the shirred casing. The shirred tubular casing contains a shirred end (28) and an unshirred end (34**); where the shirred and the unshirred ends meet is defined as the shirred-unshirred interface. The shirring machine from which the casing is delivered generally leaves a portion of the casing, i.e., the unshirred end, outside of the casing guide.

Figure 2:
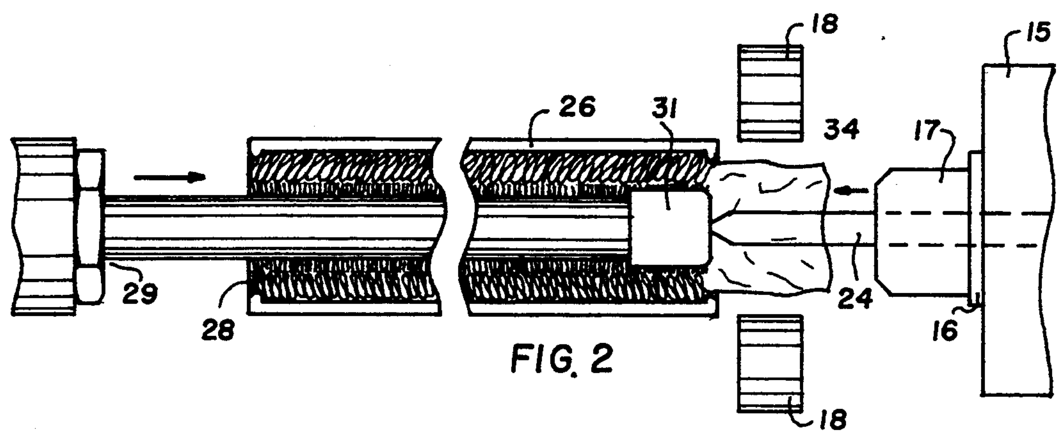
FIG. 2 is a longitudinal-section view in elevation of a shirred tubular casing illustrating the insertion of the compaction plunger supported on the internal butt into the shirred end and the end closure guide into the unshirred end of the casing.

Referring to FIG. 2, after the shirred end of the casing is secured within the casing guide, a compaction plunger (31) having an internal butt (29) attached thereto is inserted along the axis of the casing from the shirred end into the casing a distance measuring about the length of the shirred end. An end closure guide (24) having an external butt (17) attached thereto is inserted along the axis of the casing from the unshirred end into the casing, wherein the compaction plunger (31) and end closure guide (24) axially contact each other proximal to the shirred-unshirred interface.

Figure 3:
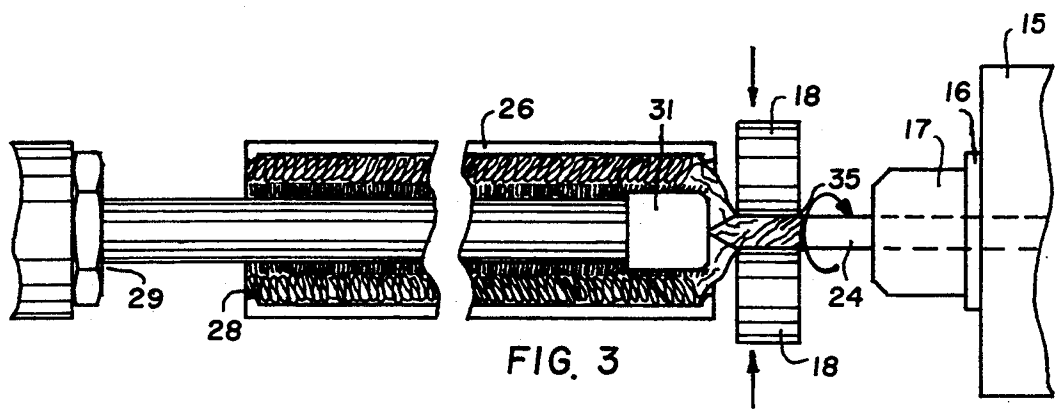
FIG. 3 is a longitudinal-section view in elevation of a shirred tubular casing illustrating the engagement of the sealing clips around the unshirred end and the rotation of the end closure guide to form a wrapped unshirred end.

Referring to FIG. 3, seal clips (18) are engaged with the unshirred end, wherein the unshirred end intimately contacts the end closure guide (24). Thereafter, the end closure guide (24) is rotated to adhere the unshirred end to the end closure guide (24), wherein the unshirred end wraps around the end closure guide sufficiently to produce a wrapped unshirred end (35).

Figure 4:
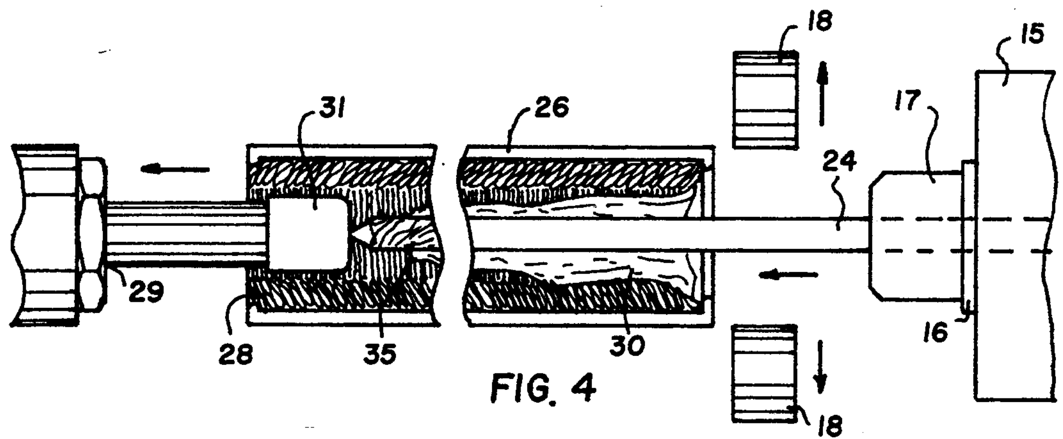
FIG. 4 is a longitudinal-section view in elevation of a shirred tubular casing illustrating the disengagement of the seal clips and the movement of the end closure guide through the casing to elongate the unshirred end.

Referring to FIG. 4, the seal clips (18) are disengaged from the wrappings, and the end closure guide (24), without further rotation is simultaneously, axially inserted into the shirred end of the casing as the compaction plunger (31) is withdrawn a sufficient distance to cause the shirred end to form an elongated unshirred end (30).

Figure 5:
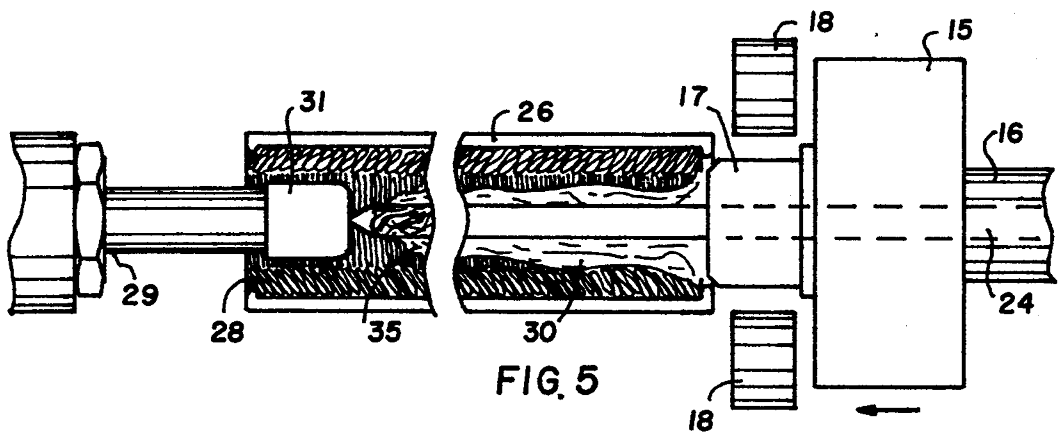
FIG. 5 is a longitudinal-section view in elevation of a shirred tubular casing illustrating the engagement of the external butt into the casing guide.

Referring to FIG. 5, the external butt (17) axially slides over the stationary end closure guide (24) into engaging contact with the casing guide (26) and the shirred-unshirred interface, wherein the casing is prevented from axially shifting.

Figure 6:
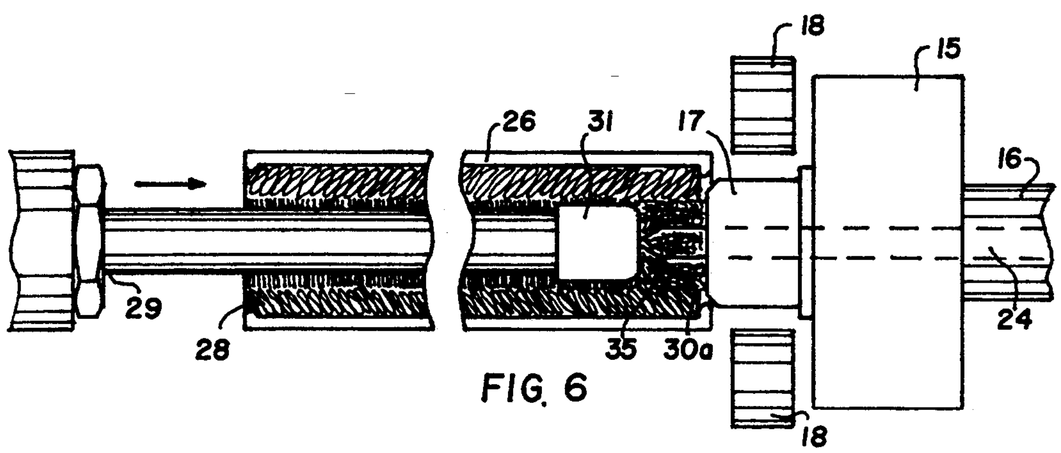
FIG. 6 is a longitudinal-section view in elevation of a shirred tubular casing illustrating movement of the compaction plunger and the compaction of the wrapped unshirred end to form an end closure.

Referring to FIG. 6, the compaction plunger (31) axially slides through the casing to the external butt (17) simultaneously as the end closure guide (24) is withdrawn therefrom, wherein the wrapped unshirred end (35) is compacted against the external butt (17) while the end closure guide (24) maintains axial alignment to form the end closure (**30*a***).

Referring to FIG. 7, the end closure guide (24) is withdrawn from contact with the compaction plunger (31) and withdrawn from the casing through the external butt (17).

Referring to FIG. 8, the compaction plunger (31) is axially withdrawn from the casing through the shirred end (28) of the casing.

Referring to FIG. 9, the external butt (17) is disengaged from contact with the casing guide (26).

Referring to FIG. 10, there is illustrated a cross-sectional view of the casing guide (26) holding the casing (28) having an end closure (**30*a*) and triangular shaped orifice (32**).

Generally, the unshirred end of the casing is at least about 15 millimeters in length, and typically the unshirred end is from about 15 to about 30 millimeters in length.

Generally, the end closure guide is generally of a shape and texture appropriate for creating sufficient friction to adhere to the unshirred end of the tubular casing thereto when engaged by the seal clips. The tip may be sharpened to form a point in the rod-like end closure guide. The tip of the end closure guide may rotate on the surface of the compaction plunger to gather unshirred casing therearound in forming the opening of the end closure. In addition to being sharpened, the cross-section of the end closure guide and tip may be a circular or polyangular shape, i.e., triangle, square, pentagon, hexagon, etc., to assist in the wrapping of the unshirred end to the end closure guide. The end closure guide may also have an abrasive or textured surface in proximity to the tip to assist in the wrapping operation.

I claim:

1. An end closure for a shirred tubular casing, prepared by a method comprising the steps of:

a. positioning a shirred, tubular casing having a hollow, axial interior, a shirred end and an unshirred end inside a casing guide for securing the shirred end against rotating or shifting about its longitudinal axis, wherein the unshirred end extends outside the casing guide at a shirred-unshirred interface;

b. axially sliding compacting means from the shirred end through the interior of the tubular casing proximal to the shirred-unshirred interface;

c. axially sliding guiding means having butting means attached thereto from the unshirred end through the interior of the tubular casing proximal to the shirred-unshirred interface, wherein the compacting means and guiding means axially contact proximal to the shirred-unshirred interface;

d. engaging a sealing means with the unshirred end, wherein the unshirred end intimately contacts the guiding means;

e. axially rotating the guiding means in contact with the unshirred end, wherein the unshirred end adheres to the guiding means and rotates therewith causing the unshirred end to wrap around the guiding means to produce a wrapped unshirred end, and wherein a portion of the shirred end may be unshirred and taken up in the wrapped unshirred end;

f. disengaging the sealing means from the wrapped unshirred end;

g. axially sliding the compacting means and guiding means having the wrapped unshirred end attached therearound through the casing to the shirred end, wherein a portion of the shirred end at the shirred-unshirred interface is unshirred and drawn through the casing to the shirred end;

h. axially sliding the butting means into engaging contact with the shirred-unshirred interface to prevent axial shifting of the casing at the interface;

i. axially sliding the compacting means and guiding means through the casing to the butting means, wherein the guiding means are disengaged from the compacting means proximal to the shirred-unshirred interface and are withdrawn from the casing, and wherein the wrapped unshirred end is compacted by the compacting means against the butting means; and j. axially withdrawing the compacting means from the casing, disengaging the butting means, and removing the securing means from the casing, wherein the end closure exhibits a partially twisted, compacted, cylindrical element having an axial opening in the cross section for releasing gases which axial opening conforms to the shape of the cross section of the guiding means.

2. The end closure according to claim 1, wherein the compacting means comprise an axial, rod-shaped internal butt having a cylindrical-shaped compaction plunger attached to its end for compacting the end closure.

3. The end closure according to claim 2, wherein the casing guide comprises at least two (2) detachably, adjoining concave plates.

4. The end closure according to claim 3, wherein the concave plates are held together by seal clips.

5. The end closure according to claim 4, wherein the unshirred end of the casing is at least about 15 millimeters in length.

6. The end closure according to claim 5, wherein the unshirred end of the casing is from about 15 to about 30 millimeters in length.

7. The end closure according to claim 6, wherein the guiding means comprise an axial shaped rod having a sharpened tip for contacting the compacting plunger.

8. The end closure according to claim 7, wherein the axial shaped rod and sharpened tip exhibit a polyangular cross section.

9. The end closure according to claim 8, wherein the guiding means comprise an axial rod having an abrasive surface.

10. The end closure according to claim 8, wherein the polyangular cross section is triangular.

11. A method for preparing an end closure in a shirred tubular casing, comprising the steps of:

a. positioning a shirred, tubular casing having a hollow, axial interior, a shirred end and an unshirred end inside a casing guide for securing the shirred end against rotating or shifting about its longitudinal axis, wherein the unshirred end extends outside the casing guide at a shirred-unshirred interface;

b. axially sliding compacting means from the shirred end through the interior of the tubular casing proximal to the shirred-unshirred interface;

c. axially sliding guiding means having butting means attached thereto from the unshirred end through the interior of the tubular casing proximal to the shirred-unshirred interface, wherein the compacting means and guiding means axially contact proximal to the shirred-unshirred interface;

d. engaging a sealing means with the unshirred end, wherein the unshirred end intimately contacts the guiding means;

e. axially rotating the guiding means in contact with the unshirred end, wherein the unshirred end adheres to the guiding means and rotates therewith causing the unshirred end to wrap around the guiding means to produce a wrapped unshirred end, and wherein a portion of the shirred end may be unshirred and taken up in the wrapped unshirred end;

f. disengaging the sealing means from the wrapped unshirred end;

g. axially sliding the compacting means and guiding means having the wrapped unshirred end attached therearound through the casing to the shirred end, wherein a portion of the shirred end at the shirred-unshirred interface is unshirred and drawn through the casing to the shirred end;

h. axially sliding the butting means into engaging contact with the shirred-unshirred interface to prevent axial shifting of the casing at the interface;

i. axially sliding the compacting means and guiding means through the casing to the butting means, wherein the guiding means are disengaged from the compacting means proximal to the shirred-unshirred interface and are withdrawn from the casing, and wherein the wrapped unshirred end is compacted by the compacting means against the butting means; and j. axially withdrawing the compacting means from the casing, disengaging the butting means, and removing the securing means from the casing, wherein the end closure exhibits a partially twisted, compacted, cylindrical element having an axial opening in the cross section for releasing gases which axial opening conforms to the shape of the cross section of the guiding means.

12. The method according to claim 11, wherein the compacting means comprise an axial, rod-shaped internal butt having a cylindrical-shaped compaction plunger attached to its end for compacting the end closure.

13. The method according to claim 12, wherein the casing guide comprise at least two (2) detachably, adjoining concave plates.

14. The method according to claim 13, wherein the concave plates are held together by seal clips.

15. The method according to claim 14, wherein the unshirred end of the casing is at least about 15 millimeters in length.

16. The method according to claim 15, wherein the unshirred end of the casing is from about 15 to about 30 millimeters in length.

17. The method according to claim 16, wherein the guiding means comprise an axial shaped rod having a sharpened tip for contacting the compacting plunger.

18. The method according to claim 17, wherein the axial shaped rod and sharpened tip exhibit a polyangular cross section.

19. The method according to claim 18, wherein the guiding means comprise an axial rod having an abrasive surface.

20. The method according to claim 18, wherein the polyangular cross section is triangular.

21. An end closure for a shirred casing prepared according to the method of claim 20.

* * * * *